(12) United States Patent
Kim

(10) Patent No.: US 12,251,075 B2
(45) Date of Patent: Mar. 18, 2025

(54) ROBOT CLEANER

(71) Applicant: LG ELECTRONICS INC., Seoul (KR)

(72) Inventor: Jaemin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 745 days.

(21) Appl. No.: 17/597,368

(22) PCT Filed: Jul. 2, 2020

(86) PCT No.: PCT/KR2020/008678
§ 371 (c)(1),
(2) Date: Jan. 4, 2022

(87) PCT Pub. No.: WO2021/006546
PCT Pub. Date: Jan. 14, 2021

(65) Prior Publication Data
US 2022/0248923 A1  Aug. 11, 2022

(30) Foreign Application Priority Data
Jul. 5, 2019 (KR) ........................ 10-2019-0081028

(51) Int. Cl.
*A47L 9/28* (2006.01)
*A47L 9/00* (2006.01)
*A47L 11/40* (2006.01)
*B60L 53/36* (2019.01)

(52) U.S. Cl.
CPC ............ *A47L 9/2873* (2013.01); *A47L 9/009* (2013.01); *A47L 9/2884* (2013.01); *A47L 11/4005* (2013.01); *A47L 11/4072* (2013.01); *A47L 11/4091* (2013.01); *B60L 53/36* (2019.02); *A47L 2201/022* (2013.01)

(58) Field of Classification Search
CPC ............................... A47L 2201/02; A47L 9/28
USPC ......................................................... 320/113
See application file for complete search history.

(56) References Cited

U.S. PATENT DOCUMENTS

2019/0231160 A1* 8/2019 Lu ....................... A47L 11/4011

FOREIGN PATENT DOCUMENTS

| CN | 208133012 U | 11/2018 |
|---|---|---|
| JP | 2004-173959 A | 6/2004 |
| KR | 10-2006-0027721 A | 3/2006 |
| KR | 10-2010-0013362 A | 2/2010 |

(Continued)

*Primary Examiner* — Eric D Lee
(74) *Attorney, Agent, or Firm* — Birch, Stewart, Kolasch & Birch, LLP

(57) ABSTRACT

The present disclosure relates to a robot cleaner, and more particularly, to a robot cleaner that replaces a battery charged in a charging base and a discharged battery of the cleaning robot simply by using power of a cleaning robot of the robot cleaner. According to the present disclosure, the cleaning robot of the robot cleaner may include at least two driving wheels, and the charging base may include a replacement unit mechanically connected to one of the driving wheel to replace batteries and a docking unit mechanically connected to the other of the driving wheel to dock the cleaning robot. Therefore, as the cleaning robot and the charging base are mechanically connected, there is an effect of exchanging batteries only by using a control unit and the driving motor of the cleaning robot.

20 Claims, 14 Drawing Sheets

(56) References Cited

FOREIGN PATENT DOCUMENTS

| | | |
|---|---|---|
| KR | 10-1047966 B1 | 7/2011 |
| KR | 10-1614316 B1 | 4/2016 |
| TW | I330071 B | 9/2010 |

\* cited by examiner

ROBOT CLEANER

TECHNICAL FIELD

The present disclosure relates to a robot cleaner, and more particularly, to a robot cleaner that replaces a battery charged in a charging base and a discharged battery of the cleaning robot only by using power of a cleaning robot of the robot cleaner.

BACKGROUND

In general, robots have been developed for an industrial purpose and have been in charge of part of factory automation. Recently, robot-applied fields have further extended to develop medical robots or aerospace robots, and household robots that may be used in ordinary homes have also been made. Among these robots, there are robots capable of traveling on its own.

A typical example of the moving robots used at home is a robot cleaner, and the robot cleaner is a device that travels by itself on a region and sucks up ambient dust or foreign objects for cleaning.

The robot cleaner is largely composed of a cleaning robot and a charging base. The cleaning robot is equipped with a rechargeable battery and it can freely move on its own using a battery's operating power, perform a cleaning operation by sucking foreign substances on the floor while moving, and return to the charging base to charge the battery if necessary.

Therefore, since the robot cleaner cannot perform cleaning while returning to the charging base and charging a battery, battery management has a great influence on the cleaning performance as well as the driving performance, and therefore, it is required to secure reliability of a battery management capability.

Korean Patent Application Publication No. 10-2006-0027721 relates to a battery auto change system and method for a robot cleaner, by which detecting a discharge state of a battery embedded in the robot cleaner, and returning to a charging base when it is necessary to replace the battery, and automatically installing the current battery. The battery is detached and connected to a charging base, and the battery charged in the charging base is mounted automatically. To this end, the robot cleaner includes a cleaning robot configured to detect a remaining voltage of a battery, changing to a charge mode based on a result of the detection, return to a charging base, and then inserting a charged battery and separating a discharged battery; and the charging base configured to insert the charged battery into the robot cleaner upon return of the robot cleaner and insert the separated battery into a charging terminal for charging.

However, since this patent should be equipped a motor for providing power and a microcomputer for controlling operations even in the charging base as well as in the cleaning robot, there are problems that an additional electronic component and a circuit design are necessary for the charging base, that microcomputers need to be synchronized, and that manufacturing costs increases.

SUMMARY

Technical Problem

The present disclosure is designed to solve the conventional problems or meet the needs above, and therefore it is an object of the present disclosure to provide a robot cleaner that replacing a battery by using only a control unit of a cleaning robot without including an additional control unit in a charging base of the robot cleaner.

It is another object of the present disclosure to provide a robot cleaner that does not include a separate driving motor on the charging base of the robot cleaner, and replaces the battery using only the driving motor of the cleaning robot.

Objects of the present disclosure may not be limited to the above and other objects which are not described may be clearly comprehended to those of skill in the art to which the embodiment pertains through the following description.

Technical Solution

In order to achieve the above objects, there is provided a robot cleaner including a cleaning robot, which has at least two driving wheels and a battery receiver capable of receiving at least two batteries, and a charging base which has a battery receiver capable of receiving at least two batteries, has a charging function, and allows the cleaning robot to be docked at an upper side.

The charging base includes a replacement unit for replacing a battery and a docking unit for docking the cleaning robot during a time for the replacement. The replacement unit is mechanically interlocked with the cleaning robot such that when one driving wheel is rotated in a predetermined direction, a charged battery is lifted, and when one driving wheel is rotated in the opposite direction upon replacement of a battery of the cleaning robot, a discharged battery is lowered. The docking unit is mechanically connected to the other driving wheel of the cleaning robot such that when the other driving wheel is rotated in a predetermined direction, the stopper is moved to fix the cleaning robot to the charging base, and when the replacement of a battery is completed, the other driving wheel is rotated in the opposite direction to return the stopper to its original position, thereby releasing the fixation of the cleaning robot.

The replacement unit may include a driven gear interlocked with one driving wheel, and a lifting part for lifting a battery in conjunction with the driven gear. The lifting part may include a support plate for supporting the battery, a rack coupled to a lower end of the support plate, a pinion gear interlocked with the rack, and a connecting shaft connecting the pinion and the driving wheel.

In addition, the cleaning robot may further include a sub-wheel at the center of the front side of the bottom, and the charging base may further include a guiderail having a groove, matching the sub-wheel, to guide the cleaning robot to a dock portion along the guiderail.

On the other hand, the replacement unit may include a belt, rather than the driven gear interlocked with the driving wheel, so as to be interlocked with the driving wheel.

Details of other embodiments are included in the detailed description and drawings.

Advantageous Effects

According to the present disclosure, since the cleaning robot and the charging base are mechanically interlocked and the replacement of the battery is controlled through the control unit provided in the cleaning robot, there is no need to separately provide a control unit in the charging base, and therefore, there are advantages effects that additional synchronization is not necessary and that costs may be cut down.

In addition, since the cleaning robot and the charging base are mechanically interlocked and a battery is replaced using a driving motor provided in the cleaning robot, an additional motor is not necessarily provided in the charging base and thus the costs may be cut down.

Effects of the present disclosure are not limited to the effects mentioned above, and other effects which are not mentioned will be clearly understood by those skilled in the art from the description of the claims.

DETAILED DESCRIPTION

Advantages and features of the present disclosure and a method of achieving the same will be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the invention to those of ordinary skill in the art to which the present disclosure pertains. The present disclosure is defined only by the scope of the claims. Throughout the specification, like numbers refer to like elements.

Hereinafter, the present disclosure will be described with reference to drawings for explaining a robot cleaner 3 according to embodiments of the present disclosure.

Figure 1:
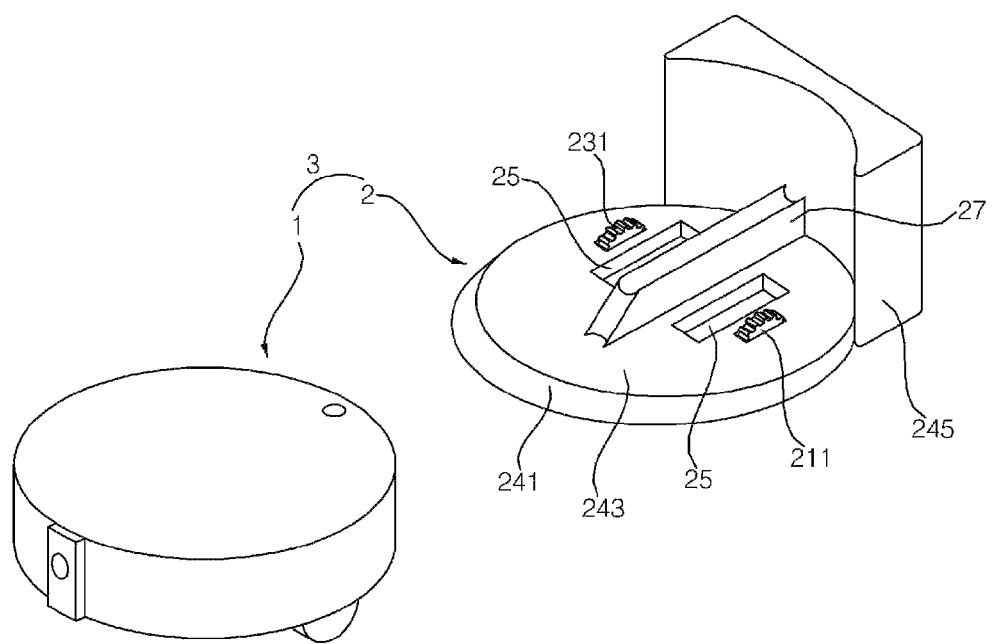
FIG. 1 is a perspective view illustrating a cleaning robot and a charging base of a robot cleaner.
Figure 2:
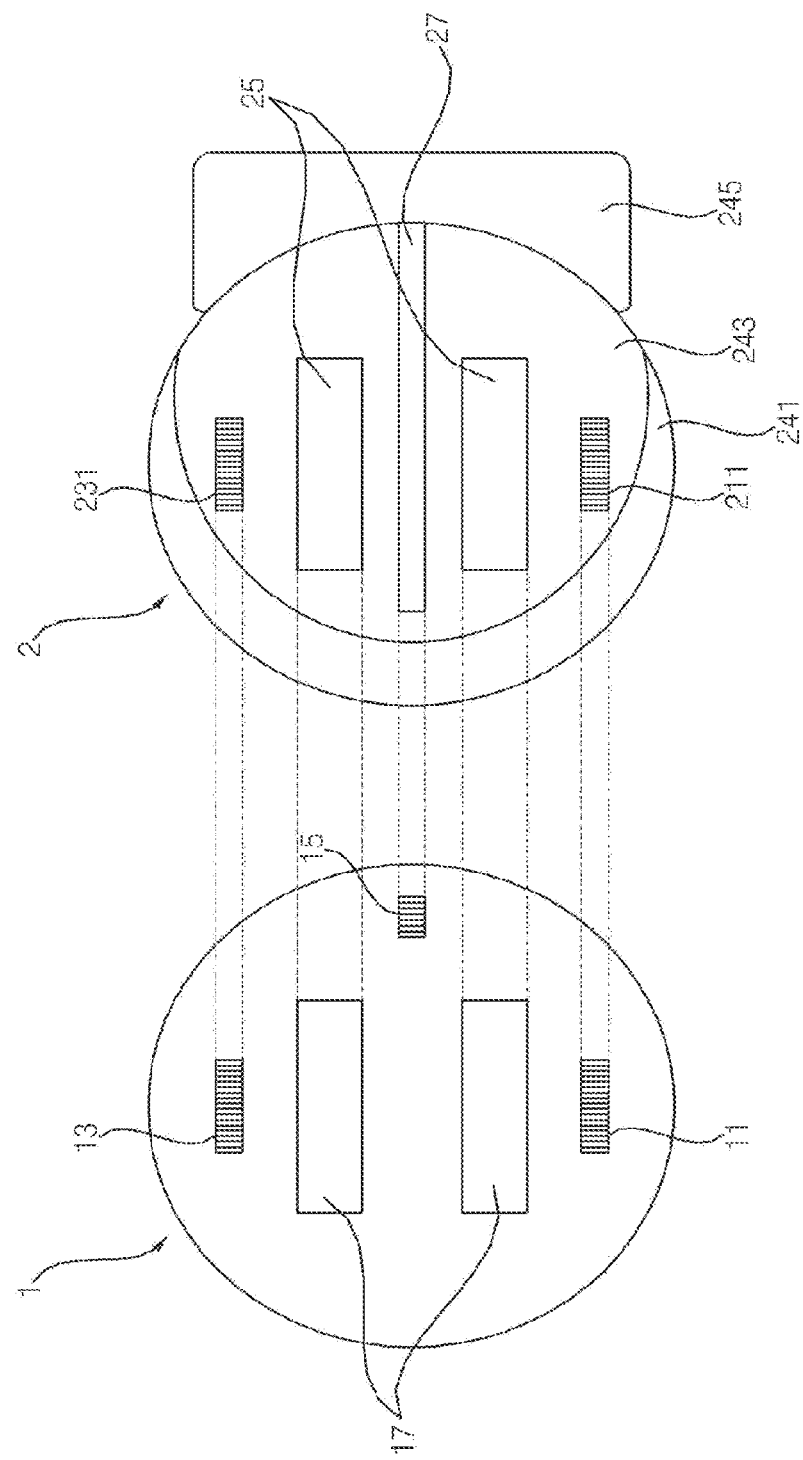
FIG. 2 shows a bottom view of a cleaning robot and a top view of a charging base according to a first embodiment of the present disclosure.
Figure 3:
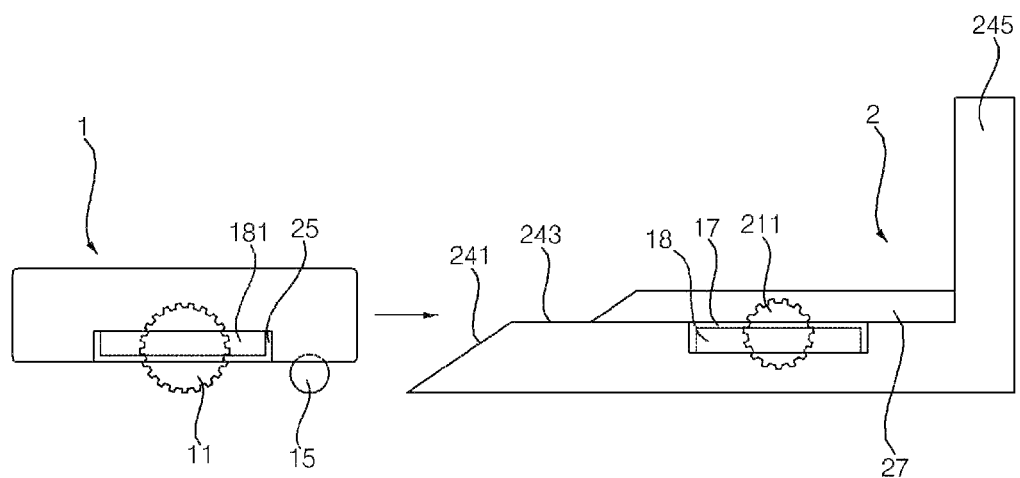
FIG. 3 is a side view of the robot cleaner shown in FIG. 2.
Figure 4:
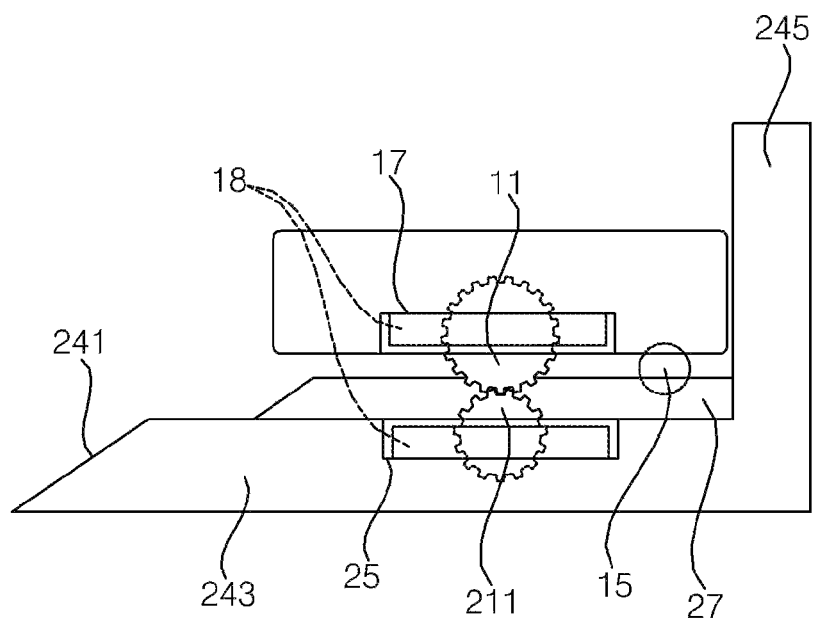
FIG. 4 is a side view showing a state in which the cleaning robot and charging base are connected in FIG. 3.

Referring to FIGS. 1 to 3, the robot cleaner 3 according to an embodiment of the present disclosure includes a cleaning robot 1 for performing a cleaning operation while moving, and a charging base 2 for charging a battery of the cleaning robot when the battery is discharged.

The cleaning robot 1 may include a case forming a space in which various components can be accommodated, and a travel drive unit for moving the cleaning robot 1 and a cleaning unit for performing a cleaning operation may be included in the case.

The travel drive unit may include at least two driving wheels 11 and 13 for moving the cleaning robot 1. The travel drive unit may include a driving motor (not shown) connected to the driving wheels to rotate the driving wheels. The driving wheels 11 and 13 may be provided on the left and right sides of the cleaning robot 1, respectively. The driving wheels may be driven by a single driving motor, but may be driven by a right driving motor for driving the first driving wheel 11 and a left driving motor for driving the second driving wheel 13 as necessary. At this point, the driving direction of the cleaning robot 1 may be switched by making a difference in the rotational speeds of the right and left driving motors.

The travel drive unit may further include a sub-wheel 15 for assisting traveling. If there are two driving wheels 11 and 13, a supporting plane for supporting the cleaning robot 1 cannot be formed and hence the cleaning robot 1 may be unstable. Accordingly, the sub-wheel 15 may be included to form the supporting plane to stably support the clearing robot 1. The sub-wheel 15 may be disposed at any position on a bottom surface of the cleaning robot 1, other than a position on a supporting line formed by the driving wheels 11 and 13. Preferably, the sub-wheel may be disposed at the center of the front side of the bottom surface. At this point, the supporting plane formed by the sub-wheel 15 and the driving wheels 11 and 13 takes the shape of an equilateral triangle, thereby enabled to stably support the cleaning robot 1.

The cleaning unit may include a dry-type cleaning device that suctions dust by negative pressure, and a wet-type cleaning device that cleans dust by mopping.

The dry-type cleaning device may include a suction port (not shown) formed in the bottom surface of the cleaning robot 1 to suction air, a suction device (not shown) for providing a suction force to cause air to be suctioned in the cleaning robot 1 through the suction port, and a dust container (not shown) for collecting dust suctioned together with air through the suction port.

The wet-type cleaning device includes a mop (not shown) for cleaning dust off the floor under the cleaning robot 1, a water container (not shown) for storing water in the cleaning robot 1 and supply water to the mop, and a water pipe (not shown) connecting the water tank and the mop.

The robot cleaner 3 may include a sensor unit (not shown) including sensors for sensing a variety of data related to an operation and a state of the robot cleaner. For example, the sensor unit may include an obstacle sensor for detecting an obstacle in the front. In addition, the sensor unit may further include a cliff sensor for detecting the presence of a cliff on the floor within an area to travel, and a lower camera sensor for acquiring an image of the floor. The obstacle sensor may include an infrared sensor, an ultrasonic sensor, an RF sensor, a geomagnetic sensor, and a Position Sensitive Device (PSD) sensor.

A battery 18 may be disposed inside the robot cleaner 3 to supply power required for overall operations of the robot cleaner 3. A battery receiver 17 may be recessed upward from the bottom surface of the robot cleaner 3, and the battery 18 may be received in the battery receiver 17. The battery receiver 17 may include a terminal, and the battery 18 may include a terminal to be brought into contact with the terminal of the battery receiver 17 so as to allow the battery 18 to be electrically connected to the battery receiver 17. The battery receiver 17 may have a fixation hook to fix the battery 18. Two or more battery receivers 17 may be provided in the cleaning robot 1, and the plurality of battery receivers 17 may be disposed in the left and right sides. However, the present disclosure is not limited thereto but may be modified to an obvious extent for those skilled in the art.

A control unit (not shown) may include a microcomputer, may be provided inside the cleaning robot 1 of the robot cleaner, and may control overall operations of the robot cleaner 3. If the battery 18 is discharged, the control unit may instruct the cleaning robot 1 to return to the charging base 2 in order to charge the battery 18, and the cleaning robot may return to the charging base by detecting a position of the charging base 2 on its own.

The cleaning robot may further include a battery detector for detecting a state of charge of the battery 18 and transmitting a result of the detection to the control unit. The battery 18 may be connected to the battery detector, so that a remaining capacity of the battery 18 and a state of charge thereof are transmitted to the control unit.

On the other hand, while the cleaning robot 1 can be provided with two or more battery receivers 17, the battery 18 may be stored only in one of the battery receivers 17, and while the charging base 2 can be provided with two or more battery receivers 25, the battery 18 may be stored only in one of the battery receivers 25. At this point, when a battery of the cleaning robot 1 is discharged, the cleaning robot 1 may return to the charging base 2 and replace the discharged battery of the cleaning robot 1 with a charged battery of the charging base, so that the cleaning robot 1 can immediately resume a cleaning operation. While the cleaning robot 1 resumes the cleaning operation, the charging base 2 may recharge the discharged battery.

The charging base 2 may be a device for charging a discharged battery by supplying electricity, and the charging base 2 may include two or more battery receivers 25 to have batteries received therein. A battery receiver 25 may include a terminal, and the battery may include a terminal to be brought into contact with the terminal of the battery receiver 25 so as to allow the battery to be electrically connected to the battery receiver 25.

The charging base 2 may include a signal transmitter for transmitting a predetermined return signal. The return signal may help the cleaning robot 1 to detect a position of the charging base 2 and may be an ultrasonic signal or an infrared signal, but not limited thereto. The cleaning robot 1 may include a signal receiver for receiving a return signal. In response to a return signal transmitted from the charging base 2, the cleaning robot 1 may return to the charging base 2 and be docked therewith under the control of the control unit.

The charging base 2 may include a docking portion 243 for docking the cleaning robot 1, an inclined portion 241 for allowing the cleaning robot 1 to climb the docking portion 243, and a blocking wall 245 for preventing the docked cleaning robot 1 from moving further.

The battery receiver 25 of the charging base may be recessed downward from an upper side of the dock portion 243. The battery receiver 25 may be placed below the battery receiver 17 of the cleaning robot 1 when the cleaning robot 1 is docked with the charging base 2.

The battery 18 may be alternately received in the battery receiver 25 of the charging base and the battery receiver 17 of the cleaning robot 1. That is, if a discharged battery is placed in a left battery receiver of the cleaning robot 1, any battery may not be placed in the left battery receiver of the charging base 2 and a charged battery may be placed in the right battery receiver of the charging base 2. Therefore, batteries may not be simultaneously placed in the same side of the battery receiver 25 of the charging and the battery receiver 25 of the cleaning robot 1.

Figure 5:
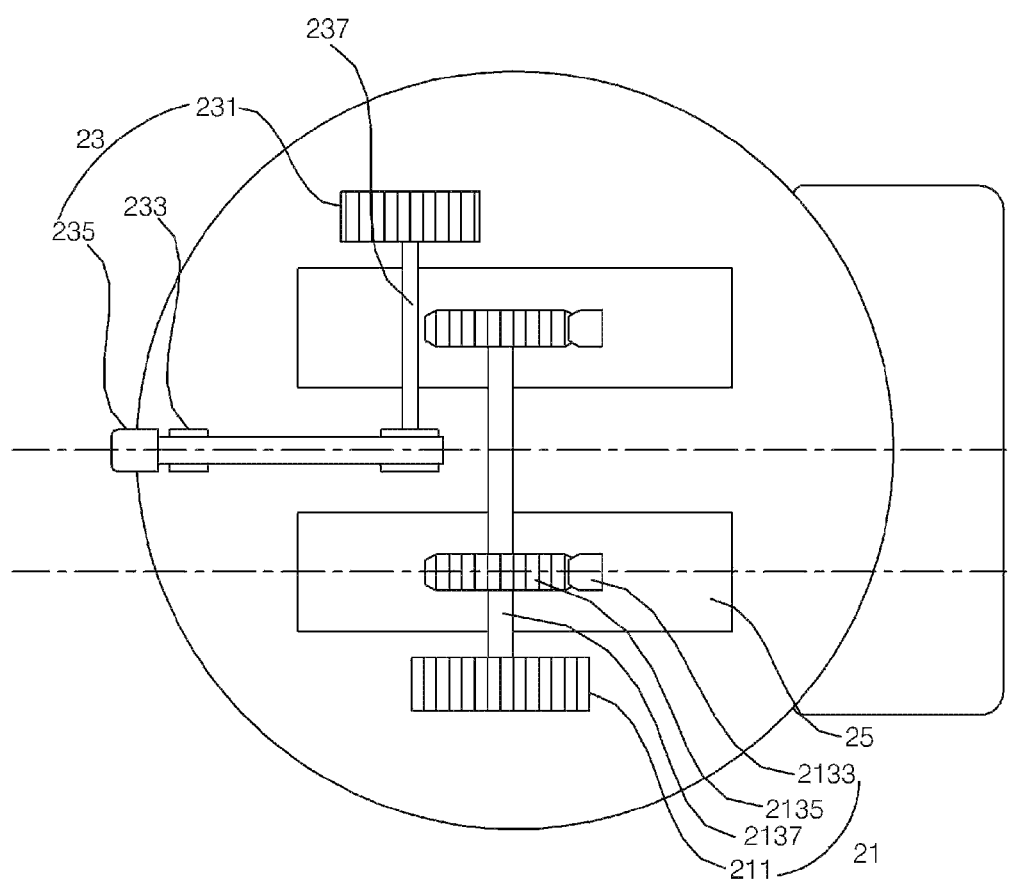
FIG. 5 is a cross-sectional plan view of the charging base according to the first embodiment of the present disclosure.

The replacement unit 21 will be described with reference to FIGS. 5 to 7.

The replacement unit 21 may be a unit for replacing a battery when the cleaning robot 1 is docked with the charging base 2. The replacement unit 21 may be engaged with one driving wheel 11 of the cleaning robot 1 to receive power of the cleaning robot 1 in order to replace the battery 18. The replacement unit 21 may be engaged with the first driving wheel 11 as shown in FIG. 5, but the present invention is not limited thereto and may be modified based on those skilled in the art such that the replacement unit 21 can be engaged with the second driving wheel 13. Hereinafter, it is assumed that a driving wheel engaged with the replacement unit 21 is a first driving wheel 11.

The replacement unit 21 may include a first driven gear 211 engaged with the first driving wheel 11, and a lifting part 213 interlocked with the first driven gear to lift and lower the battery 18.

The first driven gear 211 may have teeth to be engaged with the first driving wheel 11, and the first driving wheel 11 may have teeth to be engaged with the teeth of the first driven gear. The first driven gear 211 may be disposed below the first driving wheel 11 to be engaged therewith, and preferably, the first driven gear 211 may be disposed below the front side of the first driving wheel 11. When the first driven gear 211 is disposed below the front side of the first driving wheel 11, there are advantageous effects that a collision with a shaft of a second driven gear 231, which will be described later, can be avoided and that the first driven gear can be operated at a later timing than the second driven gear 231 so that a replacing operation S3 can be performed after the cleaning robot 1 is completely docked.

The lifting part 213 may be a mechanism for lifting and lowering a battery between the battery receiver 25 of the charging base and the battery receiver 17 of the cleaning robot by using power of the driving motor provided in the cleaning robot. The lifting part may include a support plate 2131 for supporting a battery, a rack 2133 coupled to the bottom of the support plate, a pinion gear 2135 engaged with the rack, and a connecting shaft 2137 connecting the pinion gear and the first driven gear.

The support plate 2131 may allow the battery 18 to be loaded on an upper side of the support plate, and a lower side of the support plate may be coupled with an upper end of the rack 2133. The support plate 2131 may be disposed inside the battery receiver 25 and may be lifted and lowered in the step of replacement of battery 18.

At least one support plate 2131 may be provided, and preferably, two support plates may be provided so that a battery can be alternately loaded on the two support plates.

Figure 6:
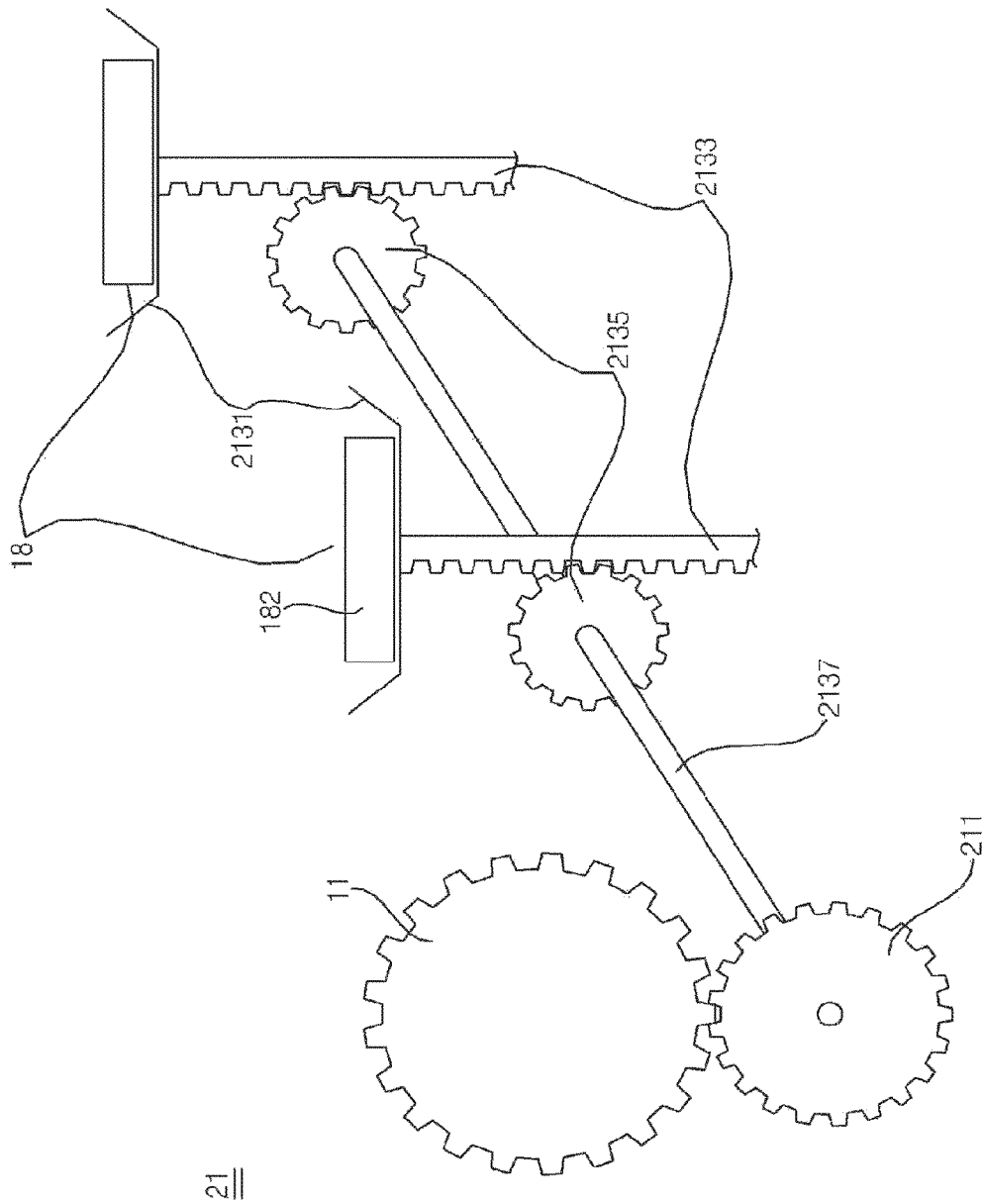
FIG. 6 is a view illustrating an interior of the replacement unit according to the first embodiment of the present disclosure.
Figure 7:
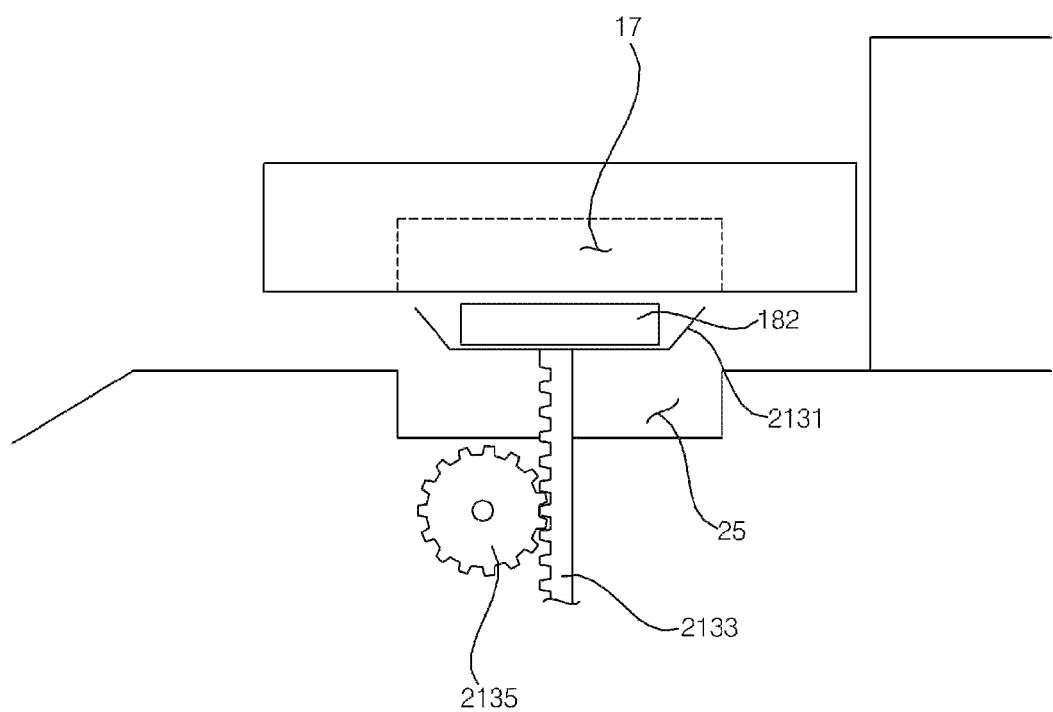
FIG. 7 is a side sectional view of a right elevation part of FIG. 5.

The support plate 2131 may have an edge bent as illustrated in FIG. 6, to thereby allow the battery to be seated at a predetermined position despite vibration and also to easily install and separate the battery in alignment with both of the battery receivers 17 and 25.

The rack 2133 may be engaged with a pinion gear, which will be described later, to thereby convert power of the motor into a vertical linear movement.

The pinion gear 2135 may be disposed below the battery receiver 25 and may be connected to the same connecting shaft 2137 as that of the first driven gear 211, thereby being rotated in the same direction as that of the first driven gear 211. The pinion gear 2135 may be engaged with the rack 2133 and may lift and lower the battery by lifting and lowering the rack.

At least one rack 2133 and at least one pinion gear 2135 may be provided, and preferably, two rack-pinion gears may be provided to alternately lift the battery.

The first driven gear 211 and the pinion gear may be connected through the same connecting shaft 2137 and therefore the first driven gear and the pinion gear may be rotated in the same direction. When two or more pinion gears are provided, the two or more pinion gears may be connected with the same connecting shaft 2137, so that the two or more pinion gears can be lifted and lowered at the same time. However, the present disclosure is not limited thereto, and the two or more pinion gears may be interlocked with different connecting shafts, so that the two or more pinion gears can be lifted and lowered separately.

For example, referring to FIG. 6, when the first driving wheel 11 is rotated forward (in a direction in which the cleaning robot moves forward and which corresponds to a clockwise direction), the first driven gear 211 may be rotated reversely, the pinion gear 2135 may be rotated reversely, the rack 2133 may be lifted, and the support plate 2131 and the battery 18 may be lifted.

A docking unit 23 will be described with reference to FIGS. 5, 8, and 9.

The docking unit 23 may be a unit for docking the cleaning robot 1 with the charging base 2 to keep the cleaning robot 1 fixed while the battery 18 is replaced. The docking unit 23 may reinforce a mechanical connection to the first driven gear 211 or the second driven gear 231 by fixing the cleaning robot 1. The docking unit 23 may be engaged with another main wheel 13 of the cleaning robot 1 and may operate by receiving power of the cleaning robot 1. The docking unit 23 may be engaged with the second driving wheel 13 as shown in FIG. 5, but the present invention is not limited thereto and may be modified based on those skilled in the art such that the docking unit 23 can be engaged with the first driving wheel 11. Hereinafter, it is assumed that the main wheel engaged with the docking unit 23 is the second driving wheel 13.

The docking unit 23 may include a second driven gear 231 engaged with the second driving wheel 13, a docking belt 233 coupled to the same connecting shaft 237 as that of the second driven gear 231, and a stopper 235 engaged with the docking belt 233 and fixing the cleaning robot 1.

The second driven gear 231 may have teeth to be engaged with the second driving wheel 13, and the second driving gear 13 may have teeth to be engaged with the teeth of the second driven gear.

The second driven gear 231 may be disposed under the second driving wheel 13 to be engaged therewith, and preferably, the second driven gear may be disposed under the rear side of the second driving wheel. When the second driven gear 231 is disposed under the rear of the second driving wheel, the second driven gear 231 may avoid a collision with the shaft of the first driven gear 211 and may be operated at an earlier timing than the first driven gear 211 so that the cleaning robot 1 can be fixed before the replacing operation S3. Accordingly, there are advantageous effects that the mechanical connection between the first/second driving wheel 11, 13 and the first/second driven gear 211, 231 can be reinforced, and that the support plate 2131 is allowed to accurately enter the battery receiver 17 of the cleaning robot.

Figure 8:
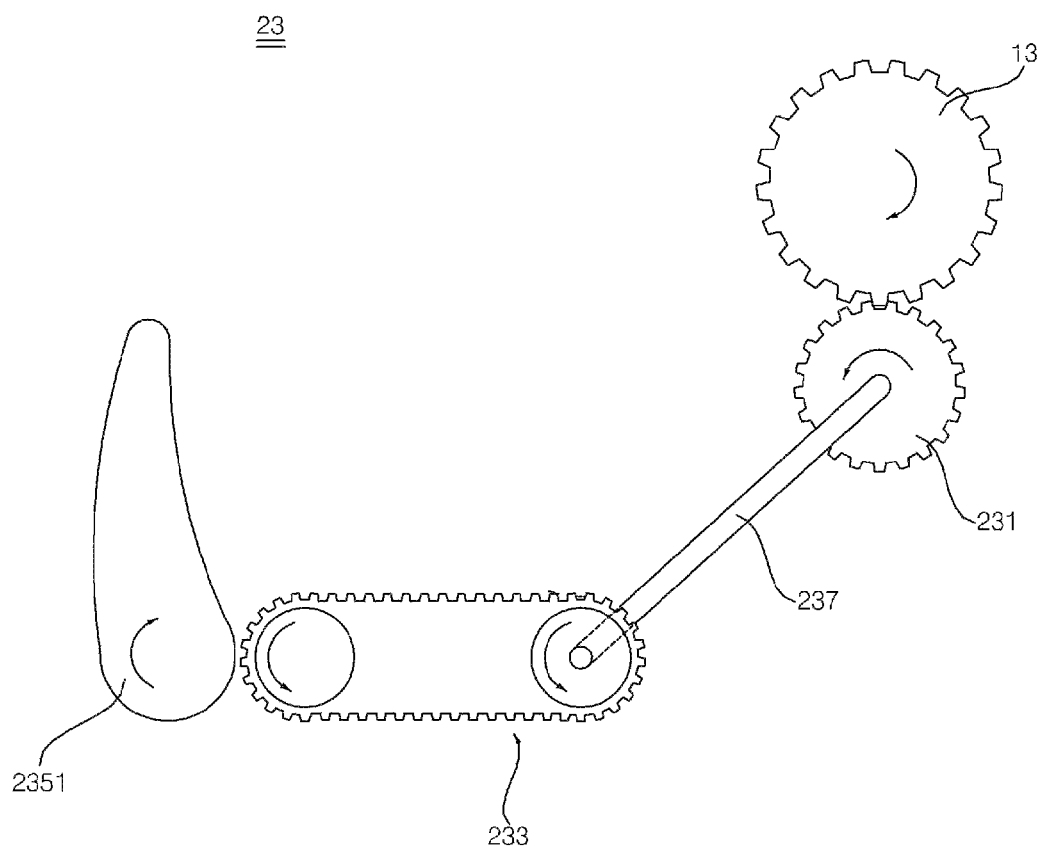
FIG. 8 is a view illustrating an interior of a docking unit according to the first embodiment of the present disclosure.

The docking belt 233 may be interlocked with the second driven gear 231 and the connecting shaft 237, as shown in FIG. 8. The docking belt 233 may be composed of two rollers at both sides and a belt surrounding the rollers, and one of the rollers may be coupled to the same connecting shaft 237 as that of the second driven gear 231. However, the present invention is not limited to this description and may be modified based on those skilled in the art to include changing to at least one or more other gears.

Figure 9A:
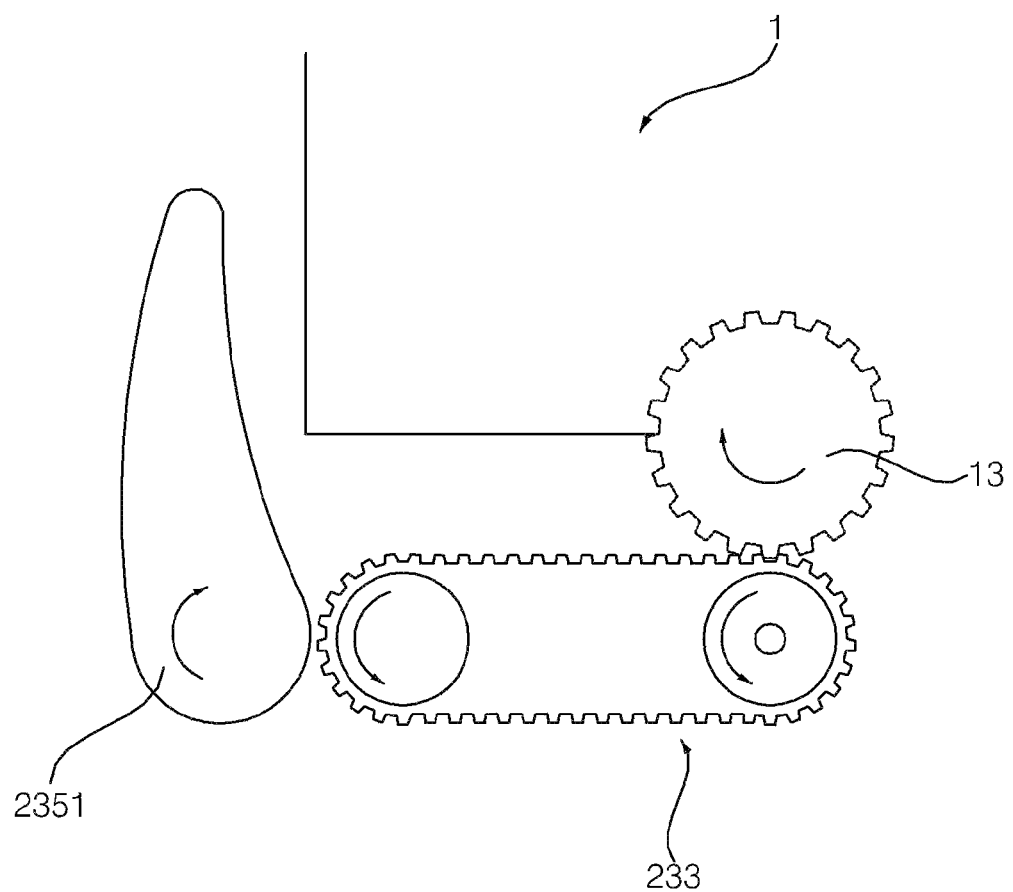
FIGS. 9A and 9B are side sectional views of a stopper of FIG. 5.

The stopper 235 may be a hook 2351 with reference to FIG. 9A, and more specifically, may be rotated about a lower end of the hook. The lower end of the hook 2351 may include a tooth engaged with the docking belt 233, so that the hook 2351 can be rotated upon rotation of the docking belt 233 to thereby fix the cleaning robot 1.

Figure 9B:
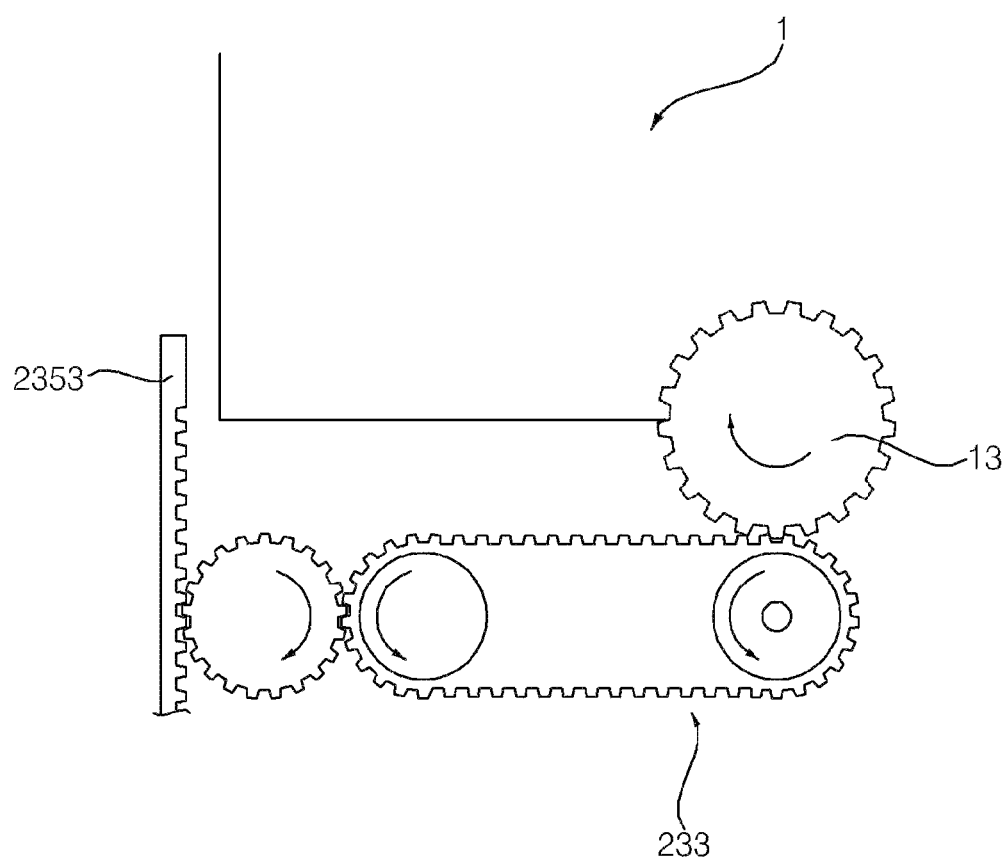
Figure 10:
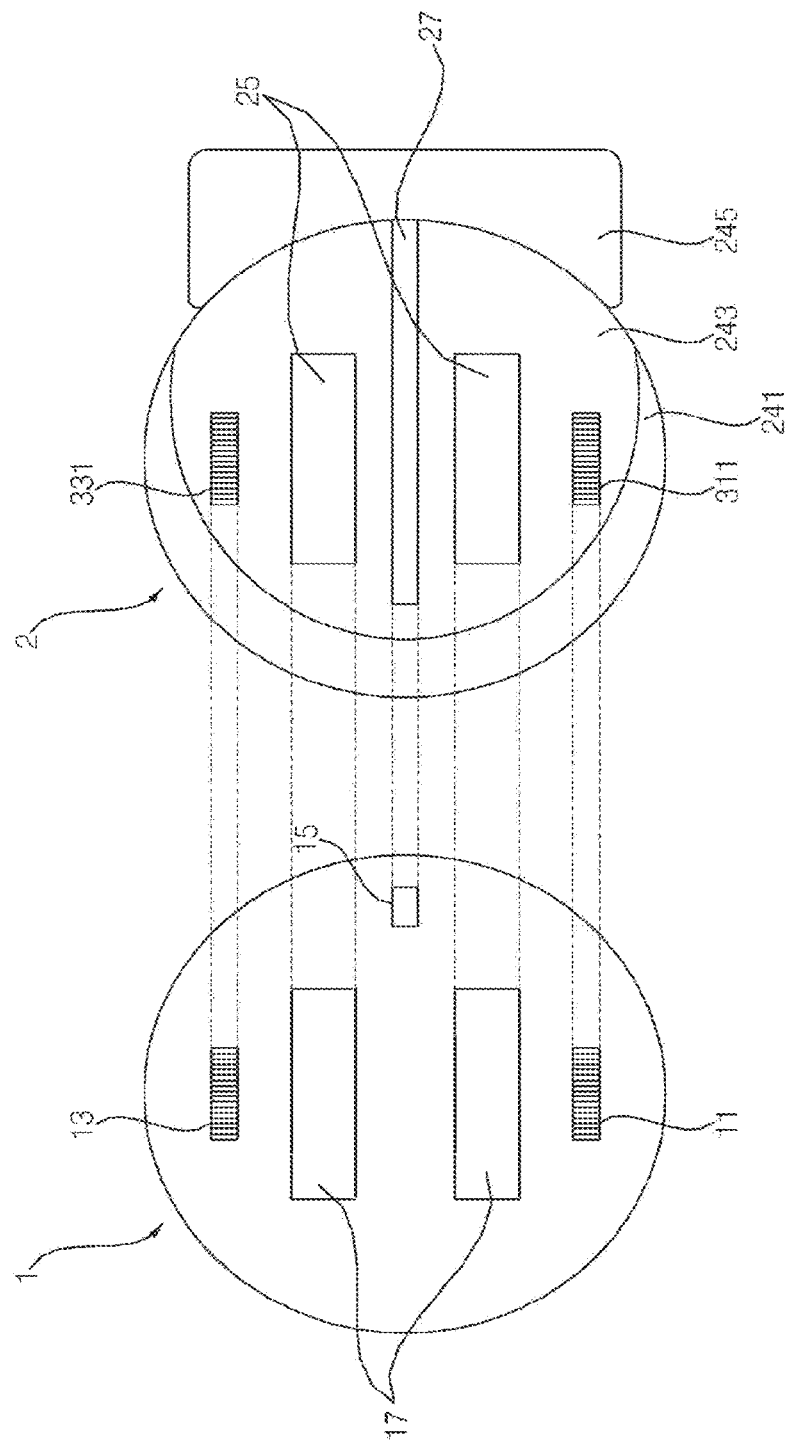
FIG. 10 shows a bottom view of a cleaning robot and a top view of a charging base according to a second embodiment of the present disclosure.

Alternatively, referring to FIG. 9B, the stopper 235 may be a rack 2353. The rack 2353 may be engaged with the docking belt 233, so that the rack 2353 can be translationally moved upon rotation of the docking belt 233 to thereby fix the cleaning robot 1.

Referring to FIGS. 9A and 9B, when the second driving wheel 13 is rotated forward (in a direction in which the cleaning robot moves forward and which is a clockwise direction in FIGS. 9A and 9B), the cleaning robot 1 may be fixed by the stopper 235, and when the second driving wheel 13 is rotated reversely (in a direction in which the cleaning robot moves forward and which is a counter-clockwise direction in FIGS. 9A and 9B), the fixation by the stopper 235 may be released. However, the present disclosure is not limited to this description and may be modified based on those skilled in the art such that the cleaning robot 1 can be fixed by the stopper 235 when the second driving wheel 13 is rotated reversely.

The guide rail 27 may be a mechanism that allows the cleaning robot 1 to be docked at a right position, and may be formed in an upper surface of the dock portion 243 of the charging base to protrude. The guide rail 27 may have a groove formed therein to guide a sub-wheel 15 of the cleaning robot to the dock portion 243. The guide rail 27 may be disposed at the center of the dock portion 243 to match the sub-wheel 15 disposed at the front center of the cleaning robot, and may be extended toward the inclined portion 241 and the stop wall 245. The guide rail 27 may form a slope at an end of the inclined portion 241, so that the sub-wheel 15 of the cleaning robot can easily enter the groove of the guide rail.

A robot cleaner 3 according to a second embodiment will be described with reference to FIGS. 11 to 14.

In the robot cleaner 3 according to the second embodiment of the present disclosure, as a driving wheel of a cleaning robot 1 and a belt of a charging base may be connected, power of the cleaning robot 1 may be received to replace a battery 18. The second embodiment cites the description of the first embodiment in a range that does not conflict with the first embodiment, and the following description will focus on the differences from the first embodiment.

A replacement unit 21 of the robot cleaner according to the second embodiment of the present disclosure may include a first belt 311 connected to a first driving wheel 11 of the cleaning robot to receive power of the cleaning robot 1, and the first belt 311 may interlock with a lifting part 213.

Figure 11:
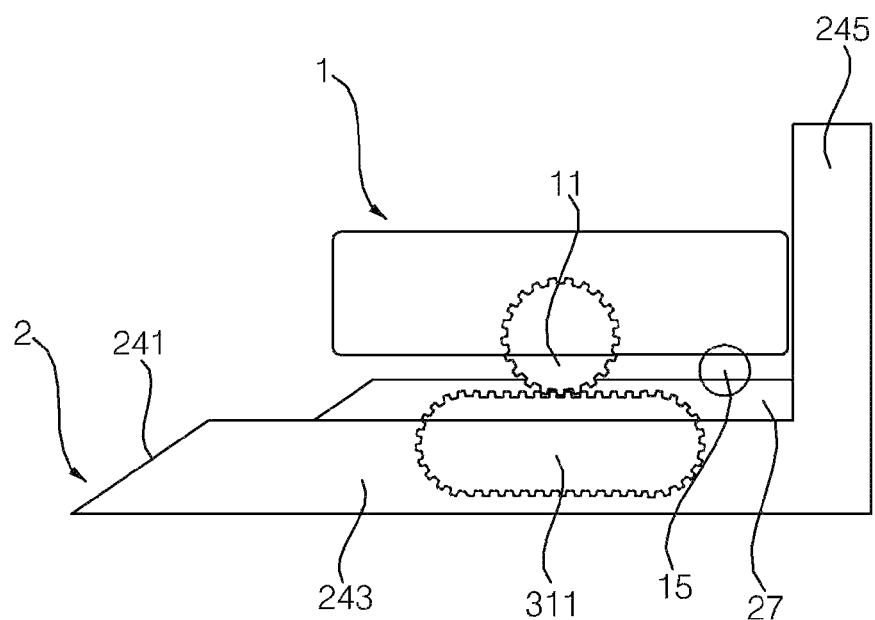
FIG. 11 is a side view of a robot cleaner shown in FIG. 10.

The first belt 311 may be composed of two or more rollers and a belt surrounding the rollers. One of the rollers may be coupled to the same connecting shaft 2137 as that of a pinion gear 2135. The connection between the above components may be gear-based connection as shown in FIG. 11, but the present invention is not limited to this and may be modified based on those skilled in the art to include changing to a component capable of transmitting power through friction.

Figure 12:
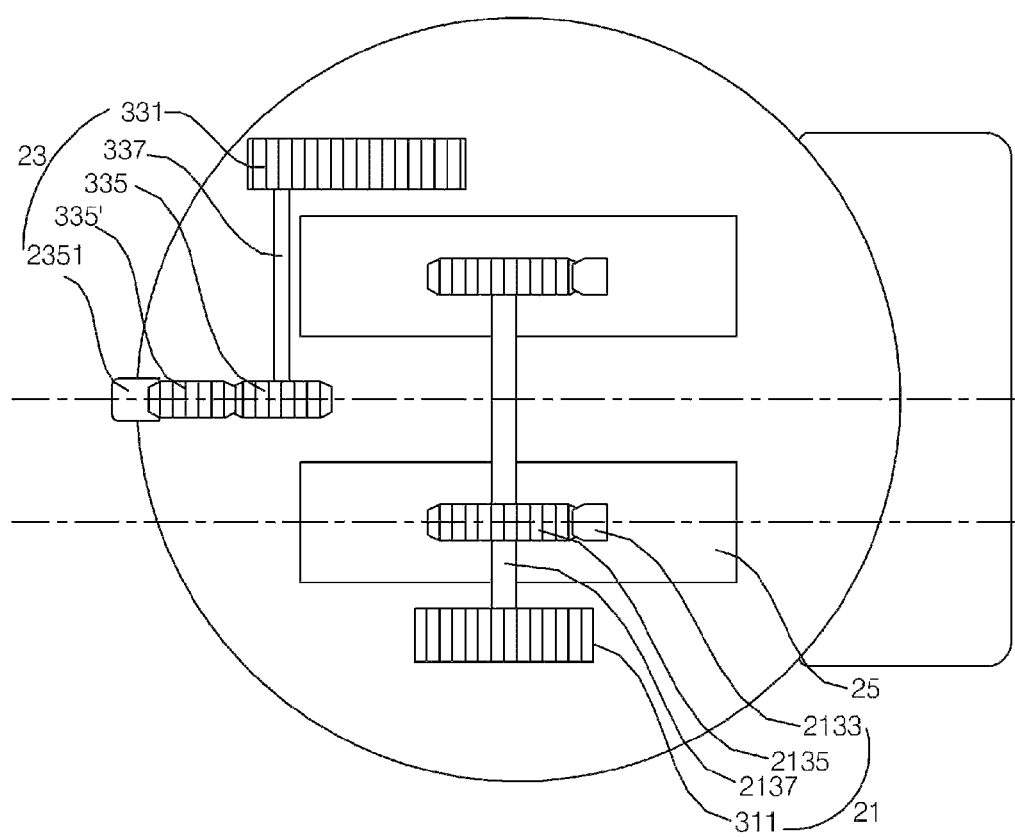
FIG. 12 is a plan view of the charging base according to the second embodiment of the present disclosure.

The first belt 311 may be disposed forward of a second belt 331, which will be described later as shown in FIG. 12. Accordingly, the second belt 331 may be first driven, and after the cleaning robot 1 is completely docked, the first belt 311 may be operated to lift and lower the lifting part 213 to a right position.

Figure 13:
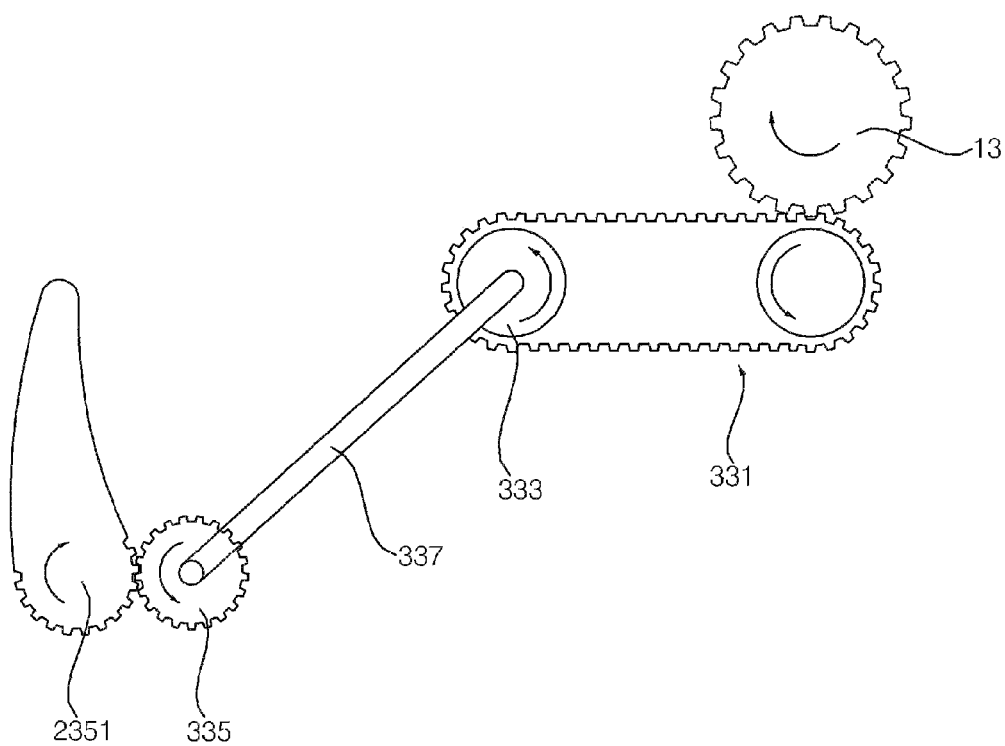
FIG. 13 is view illustrating an interior of a docking unit according to the second embodiment of the present disclosure.

Referring to FIG. 13, a docking unit 23 according to the second embodiment of the present disclosure may include a second belt 331 engaged with a second driving wheel 13 of the cleaning robot to receive power of the cleaning robot 1, a connecting shaft 337 connecting the second belt 331 and a pinion gear 335, the pinion gear 335 for transmitting power of a motor to a stopper, and a stopper 235 for receiving the power of the motor from the pinion gear 335 to fix the cleaning robot.

The stopper 235 may be a hook 2351 as shown in FIG. 13 or may be a rack 2353 with reference to FIG. 9B.

Figure 14:
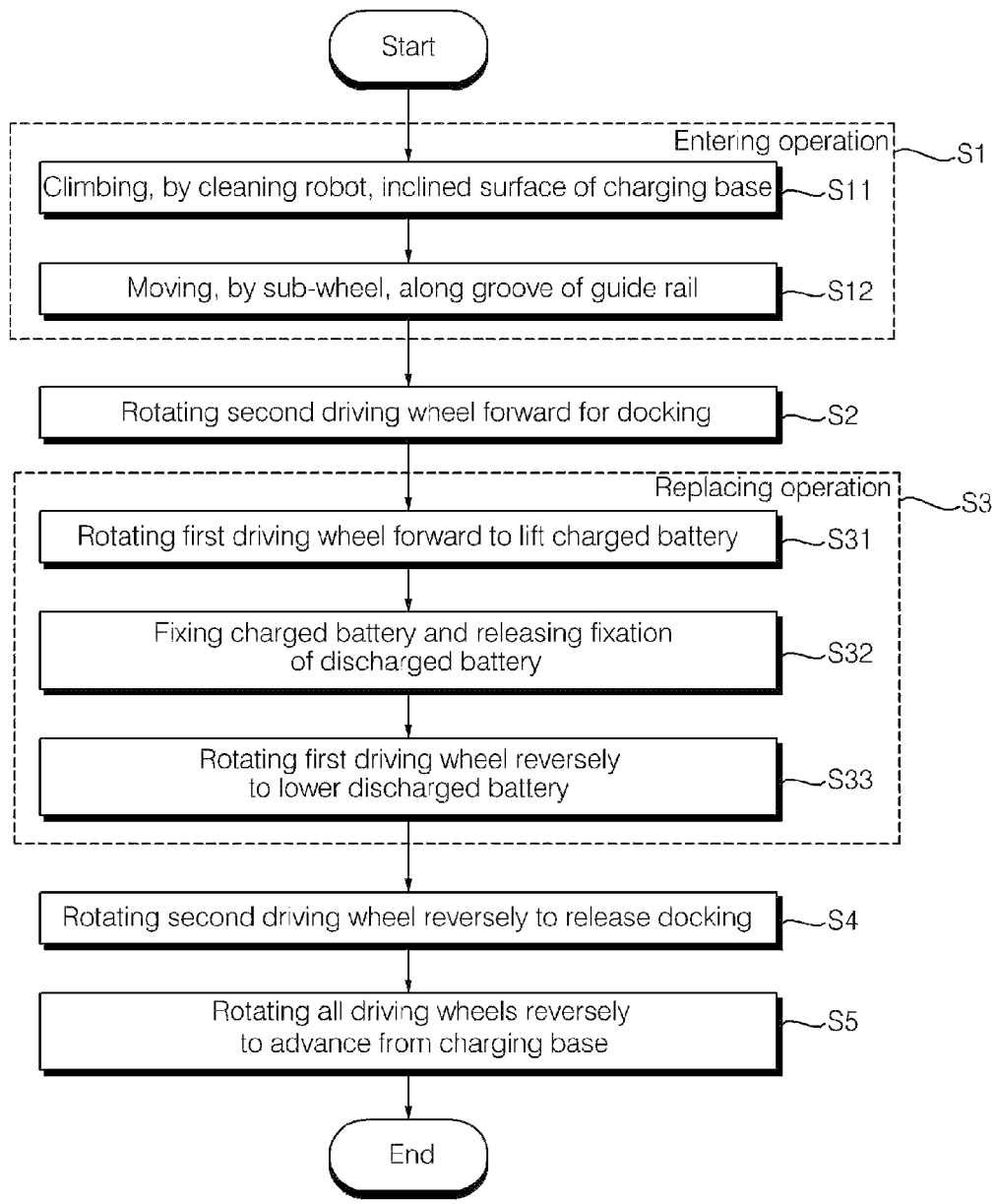
FIG. 14 is a block diagram showing a method for replacing a battery of a robot cleaner according to the present disclosure.

An operation method of the robot cleaner 3 according to the present disclosure will be described with reference to FIG. 14.

An entering process S1 is an operation of entering the cleaning robot 1 onto the charging base 2, wherein when the control unit provided in the cleaning robot 1 detects a discharged state of the embedded battery 18, the control unit controls the cleaning robot 1 to enter onto the charging base 2.

The entering operation S1 may include an operation S11 of advancing the cleaning robot 1 to climbs the inclined portion 241 of the charging base, and an operation S12 of entering the sub-wheel 15 onto the dock portion 243 along the groove of the guide rail 27.

A docking operation S2 is an operation of rotating the second driving wheel 13 forward to rotate the second driven gear 231 interlocked with the second driving wheel 13, so that the cleaning robot 1 can be docked with the stopper 235 interlocked with the second driven gear 231.

A replacing operation S3 is an operation of rotating the first driving wheel 11 of the cleaning robot 1, rotating the first driven gear 211 interlocked with the first driving wheel 11, and operating the lifting part interlocked with the first driven gear 211, so that a discharged battery of the cleaning robot can be replaced with a charged battery placed in the lifting part.

More specifically, in the replacing operation S3, the first driving wheel 11 of the cleaning robot 1 is rotated, the first driven gear 211 interlocked with the first driving wheel 11 is rotated, the pinion gear 2135 connected to the same connecting shaft 2137 as that of the first driven gear 211 is rotated, the rack 2133 engaged with the pinion gear 2135 is lifted and lowered, the support plate 2131 disposed on the top of the rack and the support plate are lifted and lowered, so that a discharged battery received in the cleaning robot can be replaced with a charged battery received in the charging base.

The replacing operation S3 includes an operation S31 of rotating the first driving wheel 11 forward and operating the lifting part interlocked with the first driving wheel to lift a charged battery, an operation S32 of fixing the charged battery and separating a discharged battery for replacement, and an operation S33 of rotating the first driving wheel reversely and operating the lifting part interlocked with the first driving wheel to lower the discharged battery.

A releasing operation S4 is an operation of rotating the second driving wheel 13 of the cleaning robot reversely 1 to rotate the second driven gear 231 interlocked with the second driving wheel 13, so that the docking by the stopper 235 interlocked with the second driven gear 231 can be released.

An advancing operation S5 is an operation of rotating, by the cleaning robot 1, all driving wheels reversely to advance from the charging base 2 along the inclined portion 241 in the dock portion 243, so that a cleaning operation can be resumed.

Although exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims, and these modifications should not be separately understood from the technical spirit and scope of the present disclosure.

What is claimed is:

1. A robot cleaner comprising:
    a cleaning robot having a driving motor, driving wheels driven by the driving motor, and a battery receiver recessed upward from a lower side; and
    a charging base having a battery receiver recessed upward from a lower side and configured to dock the cleaning robot and charge a battery,
    wherein the charging base comprises a battery replacement unit interlocked with a driving wheel and configured to replace a battery charged in the charging base with a battery mounted in the cleaning robot.

2. The robot cleaner of claim 1,
    wherein the driving wheels comprise at least two driving wheels, and
    wherein the battery replacement unit is interlocked with a first driving wheel among the driving wheels.

3. The robot cleaner of claim 2, wherein the replacement unit comprises a first driven gear interlocked with the first driving wheel.

4. The robot cleaner of claim 3, wherein the replacement unit comprises a lifting part for lifting/lowering a battery in conjunction with the first driven gear.

5. The robot cleaner of claim 4, wherein the lifting part comprises
    a support plate for supporting a battery;
    a rack coupled to a lower end of the support plate;
    a pinion gear engaged with the rack; and
    a connecting shaft connecting the pinion gear and the first driven gear.

6. The robot cleaner of claim 1, wherein the driving wheels comprise at least two driving wheels, and further comprises a docking unit interlocked with a second driving wheel among the driving wheels and fixing the cleaning robot.

7. The robot cleaner of claim 6, wherein the docking unit further comprises a second driven gear interlocked with the second driving wheel.

8. The robot cleaner of claim 7, wherein the docking unit further comprises a stopper fixing the cleaning robot in conjunction with the second driven gear.

9. The robot cleaner of claim 8, wherein the docking unit further comprises:
    a docking belt interlocked with the stopper; and
    a connecting shaft connecting one roller of the docking belt and the second driven gear.

10. The robot cleaner of claim 8, wherein the stopper is a hook.

11. The robot cleaner of claim 8, wherein the stopper is a rack.

12. The robot cleaner of claim 1,
wherein the cleaning robot further comprises a sub-wheel disposed at a center of a front side, and
wherein the charging base further comprises a guide rail having a groove that matches the sub-wheel.

13. The robot cleaner of claim 1,
wherein the driving wheels comprises at least two driving wheels, and
wherein the replacement unit further comprises a first belt interlocked with a first driving wheel among the driving wheels.

14. The robot cleaner of claim 13, wherein the replacement unit further comprises a lifting part for lifting and lowering a battery in conjunction with the first belt.

15. The robot cleaner of claim 14, wherein the lifting part comprises:
a support plate for supporting a battery;
a rack coupled to a lower end of the support plate;
a pinion gear engaged with the rack; and
a connecting shaft connecting the pinion gear and the first belt.

16. The robot cleaner of claim 1,
wherein the driving wheels comprise at least two driving wheels, and further comprises a docking unit interlocked with a second driving wheel among the driving wheels and fixing the cleaning robot, and
wherein the docking unit further comprises a second belt interlocked with the second driving wheel.

17. The robot cleaner of claim 16, wherein the docking unit further comprises a stopper fixing the cleaning robot in conjunction with the second belt.

18. The robot cleaner of claim 17, wherein the docking unit comprises:
a pinion gear interlocked with the stopper; and
a connecting shaft connecting the pinion gear and the second belt.

19. A method for replacing a battery of a robot cleaner, the method comprising:
an operation of entering a cleaning robot onto a charging base;
an operation of rotating a second driving wheel among driving wheels of the cleaning robot forward to rotate a second driven gear interlocked with the second driving wheel, so that the cleaning robot is docked with a stopper interlocked with the second driven gear;
an operation of rotating a first driving wheel among the driving wheels of the cleaning robot to rotate a first driven gear interlocked with the first driving wheel to lift and lower a lifting part interlocked with the first driven gear and loaded with the battery, so that the battery is replaced;
an operation of rotating a second driving wheel interlocked with the second driven gear to rotate the second driven gear, so that fixation by a stopper interlocked with the second driven gear is released; and
an operation of rotating all the driving wheels of the cleaning robot reversely to advance from the charging base.

20. The method of claim 19, wherein the operation comprises:
an operation of rotating the first driving wheel interlocked with the first driven gear to lift the lifting part;
an operation of releasing fixation of a discharged battery and fixing a charged battery; and
an operation of reversely rotating the first driving wheel interlocked with the first driven gear to lower the lifting part.

* * * * *